May 25, 1965  G. W. McNELLY  3,184,970

MOLTEN METAL LEVEL INDICATOR

Filed April 13, 1962  2 Sheets-Sheet 1

INVENTOR.
George W. McNelly
By Marian, Smith & Marshal
Attorneys.

May 25, 1965  G. W. McNELLY  3,184,970
MOLTEN METAL LEVEL INDICATOR
Filed April 13, 1962  2 Sheets-Sheet 2
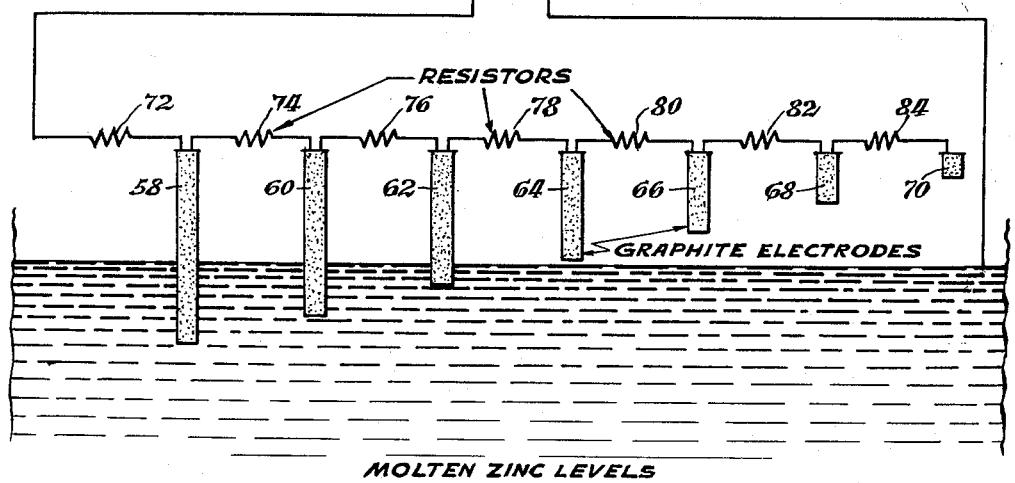
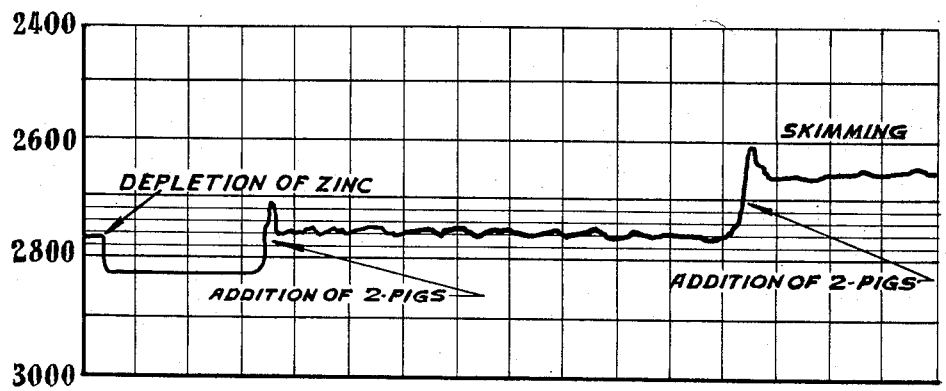
INVENTOR.
George W. McNelly
By Merriam, Smith & Marshall
Attorneys.

3,184,970
MOLTEN METAL LEVEL INDICATOR
George W. McNelly, Hammond, Ind., assignor to Inland Steel Company, Chicago, Ill., a corporation of Delaware
Filed Apr. 13, 1962, Ser. No. 187,409
9 Claims. (Cl. 73—304)

This invention relates to liquid level indicators and more particularly to apparatus for indicating the level of molten metal such as zinc or the like.

Heretofore, the level of an electrically conductive liquid has been measured by providing a series of electrodes at different levels so that the conductive path of the current varied. Difficulty was experienced, however, in adapting this system to the measurement of the level of molten metals such as zinc or the like because of the fact that slag often accumulated on the electrodes and rendered the level reading inaccurate. According to the present invention, the level of molten metal is measured in an area provided with a controlled atmosphere. By this arrangement, a level determination may be made in a slag-free zone.

In the drawings:

FIGURE 2 is a diagrammatic view of an electrical circuit used in conjunction with the sensing apparatus of FIGURE 1; and FIGURE 3 is a graph illustrating a continuous indication of a liquid level.

Figure 1:
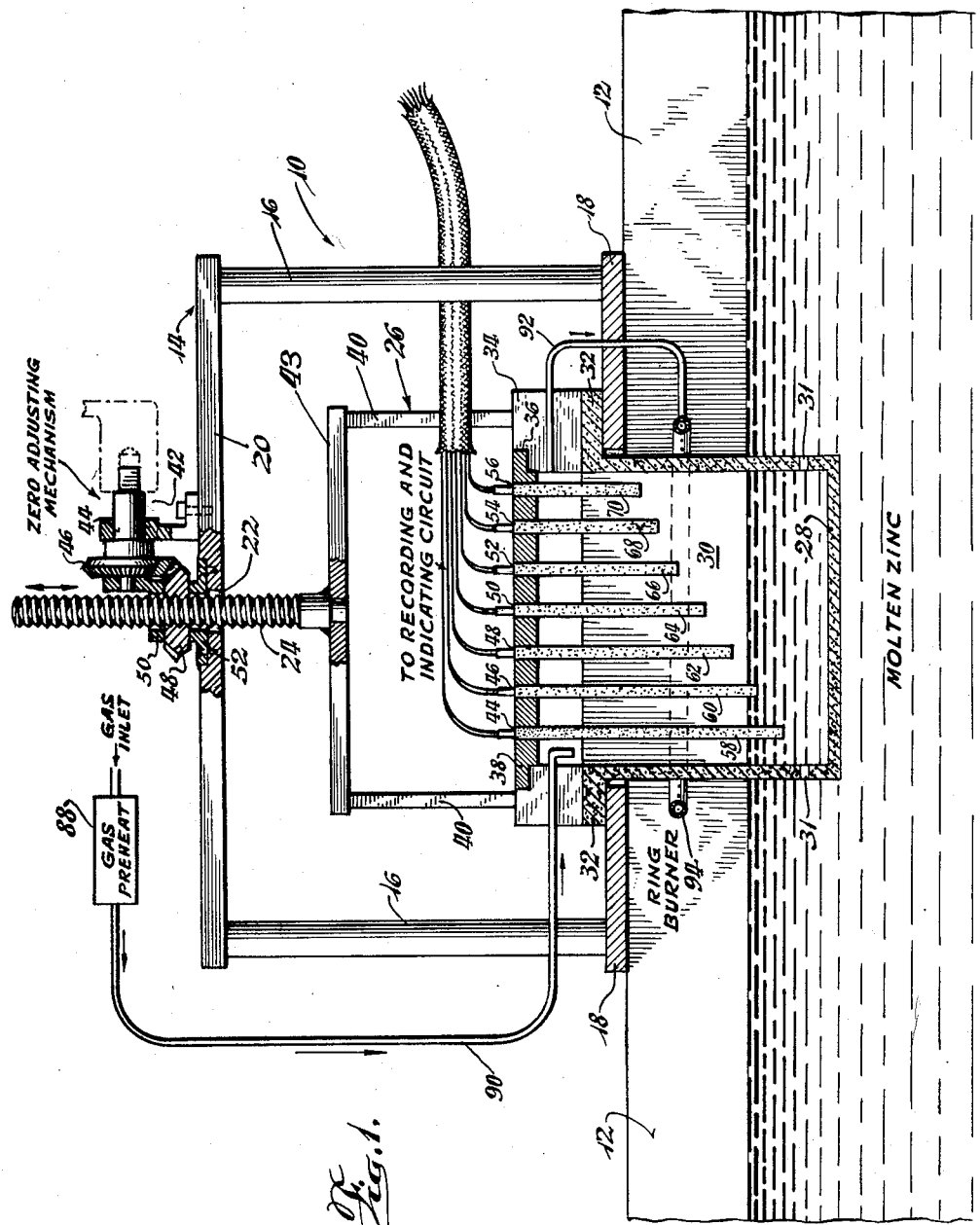
FIGURE 1 is an elevational view, partly in section, of a liquid level sensing apparatus made in accordance with the present invention.

Referring now to the drawings and more particularly to FIGURE 1, the liquid level sensing device of the present invention is indicated generally by reference numeral 10 and is shown in operative relationship to a zinc pot 12. The sensing device 10 includes a frame 14 having a pair of upright standards 16 affixed to a pair of supports 18 which rest on the edge of the pot 12. Extending across the standards 16 is a cross bar 20 having an aperture 22 for reception of a screw 24 to which is affixed a sensing unit indicated generally by reference numeral 26 and including a housing 28 of graphite or the like defining a chamber 30. Openings 31 are formed in the side wall of the housing 28 to permit the free flow of slag-free zinc into the chamber 30 at a level below the surface. The housing 28 is preferably of cylindrical configuration and is provided with an outwardly extending flange 32 to which is affixed, by any suitable means, a ring 34 having at its inner edge a cylindrical recess 36 forming a shoulder for reception of a cap 38. The ring 34 has affixed thereto a pair of standards 40 which are connected to a cross bar 43 which in turn is affixed by any suitable means, such as welding or the like, to the lower end of the screw 24.

The entire sensing unit 26 may be moved vertically by means of a zero adjusting mechanism 42 which includes a shaft 44 rotatable by any suitable means, such as an electric motor or the like, for consequent rotation of a bevel gear 46. The bevel gear 46 is in mesh with a bevel gear 48. Vertical movement of the bevel gear 48 is precluded by stationary nuts 50 and 52. As the shaft 44 rotates, the gear 46 rotates the gear 48 with the result that the screw 24 moves upwardly or downwardly, depending upon the direction of rotation, and the entire sensing unit moves vertically to a preselected position depending upon the level of molten metal in the pot 12 at a particular time.

The cap 38 is formed with a plurality of openings 44, 46, 48, 50, 52, 54, 56 for reception of graphite electrodes 58, 60, 62, 64, 66, 68 and 70. As illustrated, each of the electrodes is shorter than the next preceding electrode. Desirably, the difference in length is in the order of 1/16 inch. The difference is exaggerated on the drawings for purposes of clarity.

Referring now to FIGURE 2, the electrodes 58, 60, 62, 64, 66, 68 and 70 are arranged in series in an electrical circuit having resistors 72, 74, 76, 78, 80, 82 and 84. Also, in the circuit is a recording Wheatstone bridge 86. As illustrated, the electrodes 58, 60 and 62 are immersed in the molten zinc and electric current flows through these electrodes and through the molten zinc to ground. As a result, the resistors 72, 74 and 76 are in the electrical circuit and this fact is recorded on the bridge 86. As the level of the zinc rises, contact is made with the electrode 64 and the current then flows through the resistor 78 and thence through the electrode 64 and the molten zinc to ground. Immersion of the succeeding electrodes effects flow of current through the resistors 80, 82 and 84 as will be understood. As the level of the molten zinc drops from the position illustrated in FIGURE 2, the electrode 62 is uncovered and current no longer flows through the resistor 76 and this fact is indicated on the recorder 86. It will be appreciated that the difference in length of the electrodes in FIGURE 2 is also exaggerated for the sake of clarity, the preferred difference being in the order of 1/16 inch.

FIGURE 3 illustrates a continuous record made by the recorder 86.

According to an important feature of the present invention, the accuracy of the record made by the recorder 86 is assured because of the fact that the chamber 30 is provided with a controlled atmosphere. For this purpose, a reducing gas is fed from a suitable source to a preheater 88 from which it flows through a flexible conduit 90 into the chamber 30. By this arrangement, the atmosphere in the chamber 30 is such that slag does not form on the surface of the zinc. The gas flows from the chamber 30 through a conduit 92 to a ring burner 94 positioned in proximate spaced relation to the wall of the housing 28 to maintain the temperature of the atmosphere within the chamber 30 at a predetermined level. Burner 94 may be maintained in the desired position by brackets (not shown) attached to housing 28.

The same objective can be accomplished by feeding an inert gas to the electrode chamber and bleeding it out. The ring burner in this case would then be fired by any suitable combustible gas.

The liquid level sensing device of the present invention exhibits important advantages over level sensing devices heretofore known. For example, the controlled atmosphere chamber assures an accurate level determination because of the absence of oxidizing gases which would form slag and interfere with an accurate level determination. According to the present invention, the range of level determination may be preselected by adjusting the vertical level of the sensing unit with respect to the frame 14.

The foregoing detailed description has been given for clearness of understanding only, and no unnecessary limitations should be understood therefrom, as modifications will be obvious to those skilled in the art.

In the claims:

1. Apparatus for indicating the level of molten metal, said apparatus comprising a frame; a sensing unit; means adjustably mounting said sensing unit on said frame for limited vertical movement; said sensing unit including means defining a closed chamber, means for introducing molten metal into said chamber, and a plurality of electrodes of varying lengths mounted in said chamber in a manner that successive electrodes are immersed as the level of the molten metal rises; means for introducing a nonoxidizing gas into said chamber to prevent oxidation of the molten metal in said chamber; and means for indicating the number of electrodes immersed in said metal as a measure of the level of the molten metal.

2. Apparatus for indicating the level of a bath of molten metal, said apparatus comprising:
 means defining a closed chamber;
 means mounting said chamber for immersion in the bath of molten metal;
 heating means in surrounding relation to said chamber for maintaining the temperature of said chamber at a predetermined level;
 said chamber having an opening for introduction thereinto of molten metal from below the surface of the bath of molten metal;
 means, including a source of preheated gas, for controlling the atmosphere in said chamber;
 a plurality of electrodes of varying lengths;
 means mounting said electrodes vertically in said chamber so that successive electrodes are immersed in the molten metal as the level of molten metal rises;
 and an electrical circuit including means for indicating the number of electrodes immersed as a measure of the level of the molten metal.

3. Apparatus for indicating the level of molten metal in accordance with claim 2 and comprising means adjustably mounting said sensing unit for vertical movement to select the range of operation of said electrodes.

4. Apparatus for indicating the level of molten metal in accordance with claim 2 wherein said electrical circuit includes a plurality of resistors progressively energized by the immersion of said electrodes as the level of molten metal rises.

5. Apparatus for indicating the level of molten metal in accordance with claim 2 and comprising means for circulating said gas continuously through said chamber and then to said heating means.

6. Apparatus for indicating the level of a bath of molten metal, said apparatus comprising:
 means defining a closed chamber;
 means for immersing said chamber in said bath;
 means for admitting molten metal from below the surface of said bath into said chamber;
 heating means for maintaining said chamber at a predetermined temperature;
 a plurality of electrodes located in said chamber;
 means mounting said electrodes in vertical disposition in said chamber with the bottom of each electrode disposed at a different respective level;
 means for maintaining a controlled atmosphere in said chamber;
 and means, electrically connected to said electrodes, for indicating the number of said electrode bottoms extending below the level of said molten metal in said chamber.

7. Apparatus for indicating the level of a bath of molten metal, said apparatus comprising:
 means defining a closed chamber;
 means for immersing said chamber in said bath;
 means for admitting molten metal from said bath into said chamber;
 heating means for maintaining said chamber at a predetermined temperature;
 means in said chamber for sensing the level of said molten metal therein;
 and means for maintaining a controlled atmosphere in said chamber.

8. Apparatus as recited in claim 7 wherein said atmosphere-maintaining means includes means for circulating a non-oxidizing gas continuously through said chamber; said apparatus further comprising means for circulating said gas from said chamber to said heating means.

9. Apparatus for sensing the level of a bath of molten metal, said apparatus comprising:
 means defining a closed chamber;
 means for immersing said chamber in said bath;
 heating means for maintaining said chamber at a predetermined temperature;
 means for admitting molten metal from said bath into said chamber;
 a plurality of electrodes of varying lengths positioned vertically in said chamber;
 means for maintaining a controlled atmosphere in said chamber;
 and electrical means for indicating which of said electrodes is immersed in the molten metal.

References Cited by the Examiner

UNITED STATES PATENTS

| 820,429 | 5/06 | May | 73—304 |
|---|---|---|---|
| 2,047,995 | 7/36 | Cordy et al. | 75—9 |
| 2,610,506 | 9/52 | Taliaferro et al. | 73—313 X |
| 2,720,786 | 10/55 | Sawle | 73—359 |
| 2,910,940 | 11/59 | Colman | 73—304 |
| 2,996,915 | 8/61 | Greenwood et al. | 73—304 |
| 3,025,464 | 3/62 | Bond | 73—304 |

FOREIGN PATENTS 744,143 2/56 Great Britain.

OTHER REFERENCES

Publication Mesures (France), December 1949, page 446.

ISAAC LISANN, *Primary Examiner.*